US012656442B2

(12) United States Patent
Yoshioka et al.

(10) Patent No.: US 12,656,442 B2
(45) Date of Patent: Jun. 16, 2026

(54) RADIO WAVE ARRIVAL DIRECTION ESTIMATION DEVICE, RADIO WAVE ARRIVAL DIRECTION ESTIMATION METHOD, AND RADIO WAVE ARRIVAL DIRECTION ESTIMATION PROGRAM

(71) Applicant: NTT, Inc., Tokyo (JP)

(72) Inventors: Masafumi Yoshioka, Musashino (JP);
Fumiaki Nagase, Musashino (JP);
Keita Kuriyama, Musashino (JP);
Toshifumi Miyagi, Musashino (JP)

(73) Assignee: NTT, Inc., Tokyo (JP)

( * ) Notice: Subject to any disclaimer, the term of this patent is extended or adjusted under 35 U.S.C. 154(b) by 230 days.

(21) Appl. No.: 18/569,710

(22) PCT Filed: Jun. 15, 2021

(86) PCT No.: PCT/JP2021/022733
§ 371 (c)(1),
(2) Date: Dec. 13, 2023

(87) PCT Pub. No.: WO2022/264281
PCT Pub. Date: Dec. 22, 2022

(65) Prior Publication Data
US 2024/0288529 A1      Aug. 29, 2024

(51) Int. Cl.
G01S 3/20 (2006.01)
G01S 3/66 (2006.01)

(52) U.S. Cl.
CPC . G01S 3/20 (2013.01); G01S 3/66 (2013.01)

(58) Field of Classification Search
CPC ..................................... G01S 3/20; G01S 3/66
See application file for complete search history.

(56) References Cited

FOREIGN PATENT DOCUMENTS

| JP | 01292277 A | * | 5/1988 |
| JP | H01292277 | | 11/1989 |
| JP | 2014235044 | | 12/2014 |
| JP | 2014235044 A | * | 12/2014 |

OTHER PUBLICATIONS

Kim, "Basics and examples of direction of arrival estimation system," Design Wave Magazine, Dec. 2007, 121:112-118, 15 pages (with machine translation).

* cited by examiner

*Primary Examiner* — Thomas M Hammond, III
(74) *Attorney, Agent, or Firm* — Fish & Richardson P.C.

(57) ABSTRACT

A radio wave arrival direction estimation device according to an embodiment includes an antenna angle acquisition unit that acquires each of antenna angles indicating a plurality of different directions in which antennas having non-uniform antenna patterns are sequentially directed, a reception intensity measurement unit that measures reception intensities at which the antenna has received a radio wave at each of the antenna angles acquired by the antenna angle acquisition unit, a matching degree Calculation unit that calculates a matching degree between the antenna angle acquired by the antenna angle acquisition unit and the reception intensity measured by the reception intensity measurement unit, and an antenna pattern of the antenna for each antenna angle acquired by the antenna angle acquisition unit, and an estimation unit that estimates an antenna angle at which the matching degree Calculated by the matching degree Calculation unit is the maximum as an arrival direction of the radio wave.

9 Claims, 6 Drawing Sheets

(a)

(b)

(a)

(b)

·ANGLE D (0 DEGREES)     ·ANGLE E (+ 45 DEGREES)     ·ANGLE F (+ 90 DEGREES)
     −85 dBm                    −80 dBm                    −86 dBm (c)

CALCULATE RELATIVE POWER AND INVERSION ANGLE
(WHOSE PLUS AND MINUS ARE REPLACED) FROM MAXIMUM VALUE
·ANGLE D →   0 DEGREES, −5 dB
·ANGLE E →  −45 DEGREES, 0 dB
·ANGLE F →  −90 DEGREES, −6 dB (d)

ESTIMATED ARRIVAL
DIRECTION
(+45 DEGREES)

RADIO WAVE ARRIVAL DIRECTION ESTIMATION DEVICE, RADIO WAVE ARRIVAL DIRECTION ESTIMATION METHOD, AND RADIO WAVE ARRIVAL DIRECTION ESTIMATION PROGRAM

CROSS-REFERENCE TO RELATED APPLICATIONS

This application is a National Stage application under 35 U.S.C. §371 of International Application No. PCT/US2021/022733, having an International Filing Date of Jun. 15, 2021.

The disclosure of the prior application is considered part of the disclosure of this application, and is incorporated by reference in its entirety into this application.

TECHNICAL FIELD

The present invention relates to a radio wave arrival direction estimation device, a radio wave arrival direction estimation method, and a radio wave arrival direction estimation program.

BACKGROUND ART

Many methods for estimating an arrival direction of radio waves in a radio communication system have been proposed since the past. For example, a method of estimating the arrival direction of a radio wave from a correlation matrix obtained by using an array antenna having a plurality of antenna elements is known.

In addition, NPL 1 discloses a method of estimating the arrival direction of a radio wave using an array antenna based on a multiple signal classification (MUSIC) algorithm.

CITATION LIST

Non Patent Literature

[NPL 1] Minseok Kim, "Basis and Example of Arrival Direction Estimation System," Design Wave Magazine, CQ Publishing Co., December 2007, p. 112-118

Summary of Invention

Technical Problem

However, it has been assumed since the past that an array antenna for which a main lobe and a null point can be freely set should be used. Furthermore, in a radio communication system using a low frequency band such as a very high frequency band (VHF band), the size of antenna elements increases, and thus preparing an array antenna in which a plurality of antenna elements are used is a heavy burden, and installation of the array antenna becomes difficult.

The present invention aims to provide a radio wave arrival direction estimation device, a radio wave arrival direction estimation method, and a radio wave arrival direction estimation program which enable an arrival direction of radio waves to be estimated without using an array antenna having high directivity.

Solution to Problem

A radio wave arrival direction estimation device according to an embodiment of the present invention includes an antenna angle acquisition unit that acquires each of antenna angles indicating a plurality of different directions in which antennas having non-uniform antenna patterns are sequentially directed, a reception intensity measurement unit that measures reception intensities at which the antenna has received a radio wave at each of the antenna angles acquired by the antenna angle acquisition unit, a matching degree Calculation unit that calculates a matching degree between the antenna angle acquired by the antenna angle acquisition unit and the reception intensity measured by the reception intensity measurement unit, and an antenna pattern of the antenna for each antenna angle acquired by the antenna angle acquisition unit, and an estimation unit that estimates an antenna angle at which the matching degree Calculated by the matching degree Calculation unit is the maximum as an arrival direction of the radio wave.

In addition, a radio wave arrival direction estimation method according to an embodiment of the present invention includes an antenna angle acquisition step of acquiring each of antenna angles indicating a plurality of different directions in which antennas having non-uniform antenna patterns are sequentially directed, a reception intensity measurement step of measuring reception intensities at which the antenna has received a radio wave at each of the acquired antenna angles, a matching degree Calculation step of calculating a matching degree between the acquired antenna angle and the measured reception intensity and an antenna pattern of the antenna for each acquired antenna angle, and an estimation step of estimating an antenna angle at which the calculated matching degree is the maximum as an arrival direction of the radio wave.

Advantageous Effects of Invention

According to the present invention, the arrival direction of a radio wave can be estimated without using an array antenna having high directivity.

DESCRIPTION OF EMBODIMENTS

Figure 1:
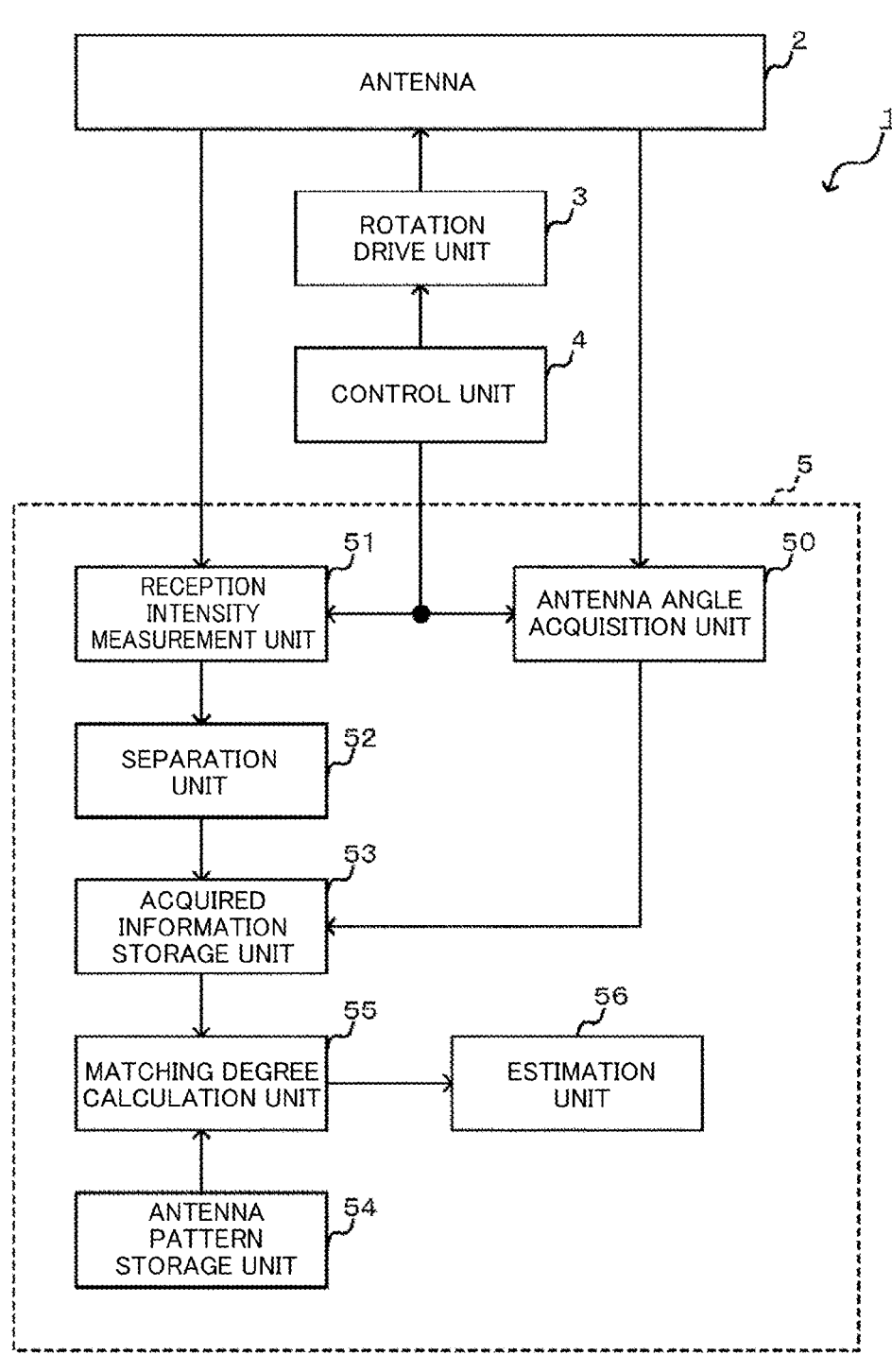
FIG. 1 is a diagram illustrating a configuration example of a communication device.

A radio wave arrival direction estimation device according to an embodiment will be described using the drawings below. FIG. 1 is a diagram illustrating a configuration example of a communication device 1. The communication device 1 includes an antenna 2, a rotation drive unit 3, a control unit 4, and a radio wave arrival direction estimation device 5 according to one embodiment, and functions as a receiving station.

The antenna 2 is provided to be rotatable in the horizontal direction, for example, receives radio waves (signals) transmitted from a transmitting station in a low frequency band such as a VHF band, and outputs the received signals to the radio wave arrival direction estimation device 5. The antenna pattern (radiation pattern) of the antenna 2 is non-uniform (see FIG. 4). The non-uniform antenna pattern indicates that the antenna has weak directivity instead of non-directivity.

The rotation drive unit 3 drives the antenna 2 to rotate in, for example, the horizontal direction according to control of the control unit 4, and sequentially directs the antenna 2 in all directions of 360 degrees.

The control unit 4 controls the rotation drive unit 3 and the radio wave arrival direction estimation device 5 in accordance with an operation of an operator on an operation unit (not shown). The antenna 2 may be directed in an arbitrary direction by a hand of an operator without relying on the rotation drive unit 3 and the control unit 4.

The radio wave arrival direction estimation device 5 includes an antenna angle acquisition unit 50, a reception intensity measurement unit 51, a separation unit 52, an acquired information storage unit 53, an antenna pattern storage unit 54, a matching degree Calculation unit 55, and an estimation unit 56.

The antenna angle acquisition unit 50 acquires antenna angles indicating a plurality of different directions in which the antenna 2 rotated by the rotation drive unit 3 is sequentially directed, and outputs the antenna angles to the reception intensity measurement unit 51 and the acquired information storage unit 53. The antenna angle acquisition unit 50 may receive data indicating antenna angles from the antenna 2 or may acquire the data from the control unit 4. In addition, the antenna angle acquisition unit 50 may acquire the antenna angles from data input to the operation unit (not shown) by the operator.

The reception intensity measurement unit 51 measures reception intensities of radio waves received by the antenna 2 at each of antenna angles acquired by the antenna angle acquisition unit 50 by associating the angles with the intensities, and outputs the measurement result to the separation unit 52.

For example, the reception intensity measurement unit 51 measures the reception intensities at a plurality of antenna angles spaced at equal intervals. The reception intensity measurement unit 51 may also measure the reception intensities of the radio wave by setting all or some of antenna angles at which the reception intensities are measured to both ends (maximum angle and minimum angle) of settable antenna angles and antenna angles spaced at equal intervals in the remaining range. Furthermore, the reception intensity measurement unit 51 may acquire the reception intensities at each of the antenna angles from the measurement data of the reception intensities input to the operation unit (not shown) by the operator.

The separation unit 52 separates, for example, components and noise of delayed waves from the reception intensities measured by the reception intensity measurement unit 51, and outputs data in which the reception intensity of a predetermined incoming wave or delayed wave is associated with an antenna angle to an acquired information storage unit 53. For example, the separation unit 52 separates the incoming wave and the delayed wave so as not to include interference waves and noise based on a correlation between a known pattern such as a synchronization signal and a reception signal transmitted by a transmitting station.

Figure 2:
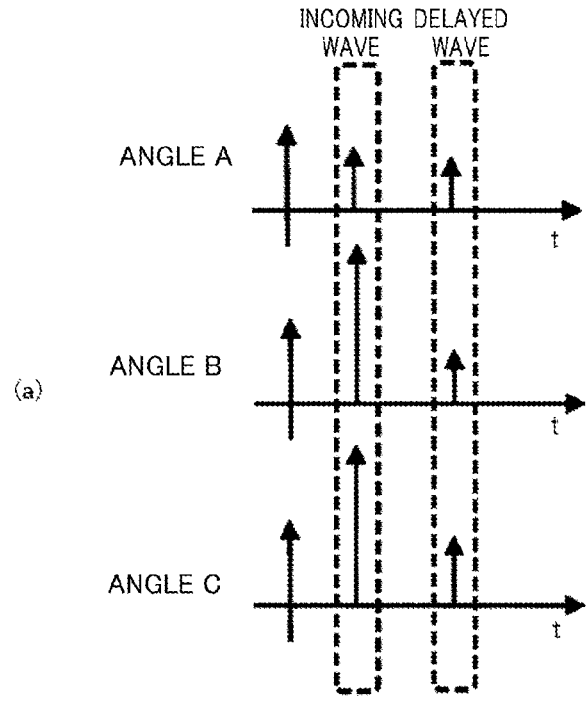
FIG. 2(a) is a diagram illustrating reception intensities of radio waves received by the antenna at three different antenna angles.
FIG. 2(b) is a diagram illustrating three antenna angles and radio wave intensities after components, noise, and the like of a delayed wave are separated.
Figure 2:
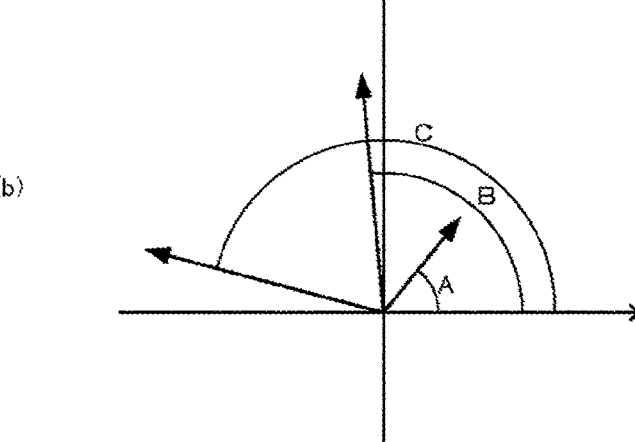

FIG. 2 is a diagram illustrating data to be output to the acquired information storage unit 53 after the separation unit 52 separate components, noise, and the like of a delayed wave. FIG. 2($a$) is a diagram illustrating reception intensities (on the vertical axes) of radio waves received by the antenna 2 at three different antenna angles. FIG. 2($b$) is a diagram illustrating three antenna angles and radio wave intensities after components, noise, and the like of a delayed wave are separated.

A radio wave transmitted by a transmitting station and propagated through multiple paths is measured by a receiving station to know from which direction and at what intensity the incoming wave and the delayed wave are arriving. At this time, the direction in which the incoming wave and the delayed wave arrive is constant (true value or constant value) .

When the antenna for receiving radio waves has directivity, the measured value of the reception intensity is high or low due to the characteristic (directivity) at the angle at which the antenna is directed. That is, reception intensities are distorted so as to differ depending on the direction in which the antenna is directed, and are not uniform.

Therefore, since the directivity (a distortion characteristic or an antenna pattern) of the antenna 2 is stored in the antenna pattern storage unit 54, which will be described below, the radio wave arrival direction estimation device 5 estimates the arrival direction (true value) by using the antenna pattern.

For example, the antenna 2 receives an incoming wave and a delayed wave having different reception intensities at three different antenna angles A, B and C as illustrated in FIG. 2($a$).

Then, the separation unit 52 separates each incoming wave or delayed wave (or delayed waves after a second delayed wave) with the same propagation time received at the antenna angles A, B, and C of the antenna 2 based on the propagation time from the transmitting station to the antenna 2, and the like (FIG. 2($a$)).

Furthermore, as illustrated in FIG. 2($b$), the separation unit 52 outputs, to the acquired information storage unit 53, the reception intensity from which each incoming wave with the same propagation time (or a delayed wave with the same propagation time) at the antenna angles A, B and C due to the rotation of the antenna 2 has been separated. That is, the data output from the separation unit 52 to the acquired information storage unit 53 is combinations of the values of the antenna angles A, B, and C and the reception intensities of the antenna angles, and thus corresponds to the three vectors illustrated in FIG. 2($b$).

However, when the distance from the transmitting station to the antenna 2 is long, the reception intensity of the data output from the separation unit 52 to the acquired information storage unit 53 becomes low at any antenna angle. For this reason, the matching degree Calculation unit 55, which will be described later, enlarges or reduces the combinations of the values of the antenna angles A, B, and C with the reception intensities at the antenna angles as a whole from the origin to facilitate comparison with an antenna pattern. In other words, the true arrival direction of the radio wave can be estimated by rotating, around the origin, the combinations of the reception intensities with the antenna angles with the same propagation time after the combinations are enlarged or reduced from the origin.

The separation unit 52 may separate each incoming wave with the same propagation time or each delayed wave with the same propagation time for each antenna angle. For example, when it is not easy to separate the first incoming wave, the separation unit 52 outputs data separated for each delayed wave with the same propagation time to the acquired information storage unit 53. That is, the radio wave arrival direction estimation device 5 can estimate the arrival direction of the radio wave at the measurement time of the reception intensity for each incoming wave with the same propagation time or each delayed wave with the same propagation time.

The acquired information storage unit 53 (FIG. 1) stores, for example, data indicating the antenna angles acquired by the antenna angle acquisition unit 50, and data in which the reception intensity of a predetermined incoming wave separated by the separation unit 52 is associated with an antenna angle, and outputs the data in response to access from the matching degree Calculation unit 55.

The antenna pattern storage unit 54 stores data indicating the antenna pattern of the antenna 2 (gains of antenna angles), and outputs the data in response to access from the matching degree Calculation unit 55.

The matching degree Calculation unit 55 reads and acquires the data stored in the acquired information storage unit 53 and the data stored in the antenna pattern storage unit 54, respectively, and performs matching (comparison of matching degrees).

For example, the matching degree Calculation unit 55 calculates the antenna angle acquired by the antenna angle acquisition unit 50 and the matching degree between the reception intensity measured by the reception intensity measurement unit 51 and the antenna pattern of the antenna 2 for each antenna angle acquired by the antenna angle acquisition unit 50, and outputs the result to the estimation unit 56.

More specifically, the matching degree Calculation unit 55 calculates the matching degree between the antenna angle acquired by the antenna angle acquisition unit 50 and the reception intensity after the separation unit 52 separated the component and noise of the delayed wave, and the antenna pattern of the antenna 2 for each antenna angle acquired by the antenna angle acquisition unit 50, and outputs the result to the estimation unit 56.

In addition, in order to adjust the intensity of reception power according to the transmission distance, or the like, the matching degree Calculation unit 55 may correct the reception intensity at another antenna angle with reference to the reception intensity at an arbitrary antenna angle, the reception intensity at an antenna angle close to the average value of the reception power, the reception intensity at the antenna angle at which reception power is the maximum, the reception intensity at a predetermined antenna angle, or the like. In addition, the matching degree Calculation unit 55 may enlarge or reduce the combinations of the values of the antenna angles A, B, and C with the reception intensities at the antenna angles as a whole from the origin to collate the combinations with an antenna pattern.

In this way, the matching degree Calculation unit 55 collates the reception intensity of the incoming wave (or the delayed wave) at each antenna angle with the same propagation time with the antenna pattern to calculate the matching degree. For example, the matching degree Calculation unit 55 rotates, around the origin, the combinations of reception intensities with the antenna angles enlarged or reduced as a whole from the origin, and calculates the matching degree of the combinations and the antenna pattern in each direction.

At this time, the matching degree Calculation unit 55 may not use all data of the reception intensities measured at the same propagation time. For example, the matching degree Calculation unit 55 calculates the matching degree of the data with the antenna pattern without using data of the reception intensity having a large difference from the antenna pattern to be excluded, as in the specific operation example of the radio wave arrival direction estimation device 5 to be described later with reference to FIG. 5.

However, when the distance from the transmitting station to the antenna 2 is long, the reception intensity at each antenna angle is weak, and thus, it is thought that, when the matching degree is calculated by collating the antenna pattern with the antenna angle, the accuracy may become lower.

For this reason, the matching degree Calculation unit 55 first enlarges (or reduces) the combinations of the reception intensities with the antenna angles as a whole from the origin, and performs processing for bringing the size of the reception intensity at each antenna angle to be collated close to the size of the antenna pattern. At this time, the matching degree Calculation unit 55 excludes data estimated as an abnormal value having a large deviation, as will be described later with reference to FIG. 5.

Then, the matching degree Calculation unit 55 rotates the collation objects whose sizes have been brought close to each other around the origin, and calculates the matching degree with respect to the antenna pattern in each direction, and thereby accuracy in matching degree is improved.

The matching degree Calculation unit 55 may select a combination in which the total sum of absolute values of gain differences is the minimum as a comparison method for the matching degree of the angle and reception intensity of the incoming wave with the antenna pattern, or may select a combination in which the sum of squares of the absolute values is the minimum.

The estimation unit 56 estimates the antenna angle at which the matching degree Calculated by the matching degree Calculation unit 55 is the maximum as the arrival direction of the radio wave to the communication device 1. Here, the maximum matching degree refers to a combination in which the difference between the antenna angle and the reception intensity and the antenna pattern is the minimum, for example.

Figure 3:
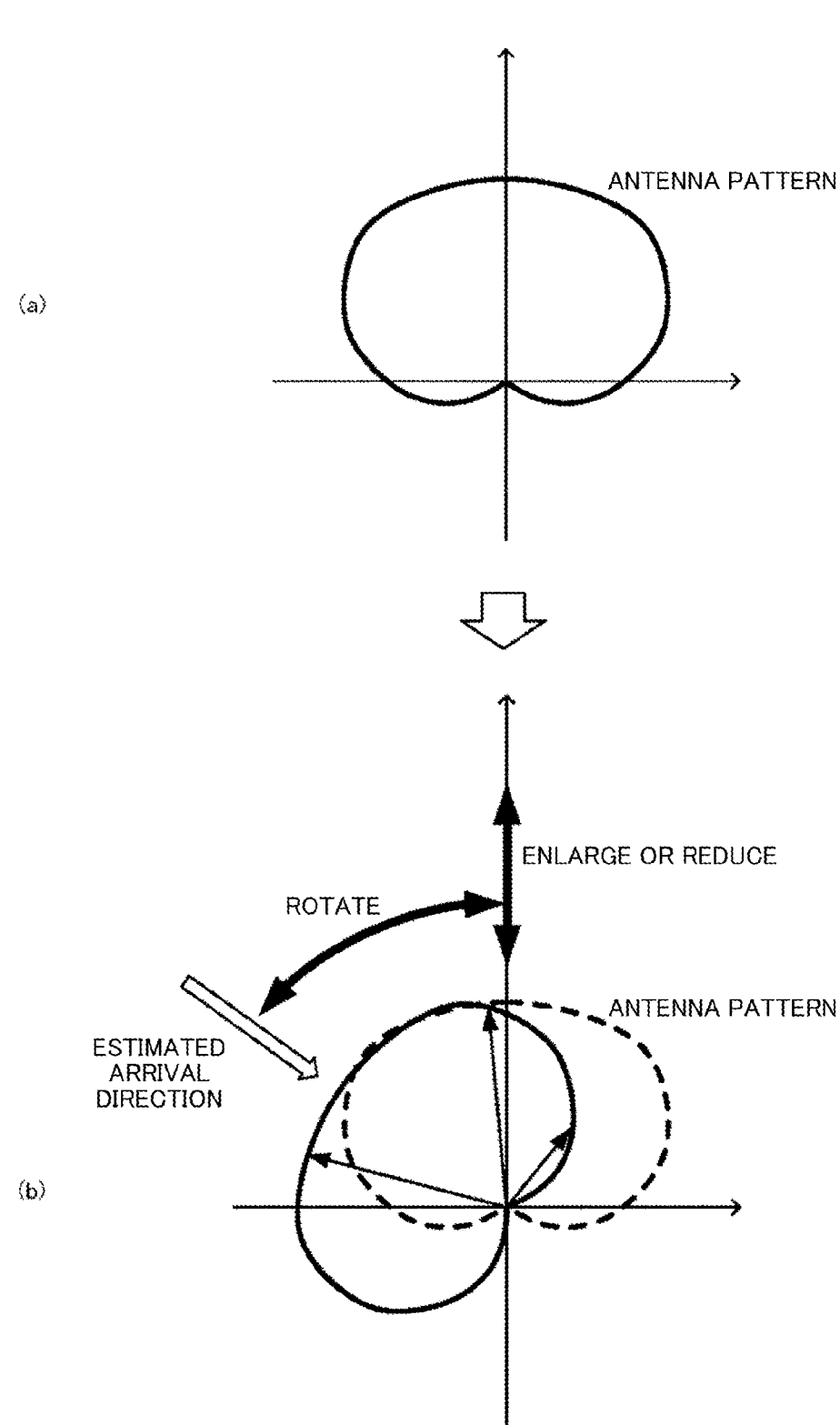
FIG. 3(a) is a diagram illustrating an antenna pattern of an antenna.
FIG. 3(b) is a diagram schematically illustrating the result of estimation of a radio wave arrival direction by an estimation unit using the antenna pattern.

FIG. 3 is a diagram illustrating the arrival direction of the radio wave estimated by the estimation unit 56. FIG. 3(*a*) is a diagram illustrating an antenna pattern of the antenna 2. FIG. 3(*b*) is a diagram schematically illustrating the result of estimation of the arrival direction of the radio wave obtained by the estimation unit 56 using the antenna pattern.

The estimation unit 56 rotates, for example, the reception intensity (see FIG. 2 (*b*)) of each antenna angle calculated by enlarging (or reducing) the matching degree Calculation unit 55 so as to approach the size of the antenna pattern with the origin as a reference, and estimates the antenna angle (FIG. 3 (*b*)) where the matching degree with the antenna pattern (FIG. 3 (*a*) is the maximum as the arrival direction of the radio wave to the communication device 1.

Figure 4:
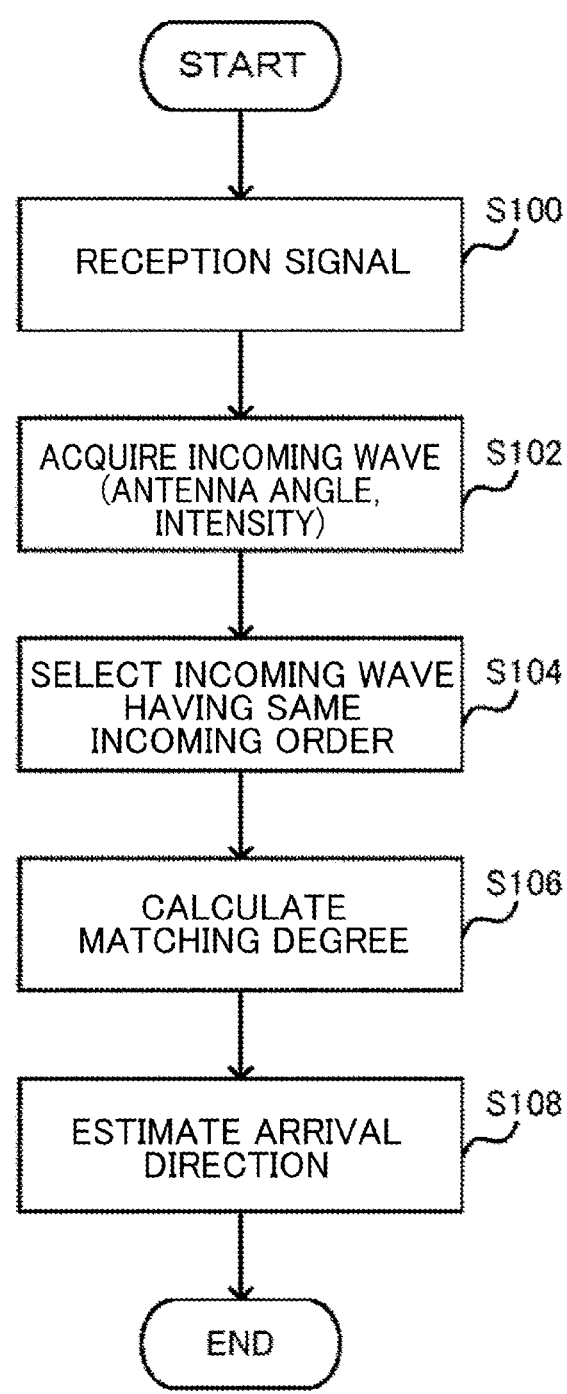
FIG. 4 is a flowchart showing an operation example of a radio wave arrival direction estimation device according to a first embodiment.

FIG. 4 is a flowchart showing an example of operation of the radio wave arrival direction estimation device 5 according to an embodiment. As shown in FIG. 4, the radio wave arrival direction estimation device 5 receives a signal transmitted by a transmitting station via the rotating antenna 2 (S100), and acquires incoming waves with reception intensities at a plurality of antenna angles (S102).

Next, the radio wave arrival direction estimation device 5 selects (extracts) incoming waves that have come in the same order at respective antenna angles (S104), and calculates the matching degree of the antenna angle, reception intensity, and antenna pattern for each antenna angle (S106).

Then, the radio wave arrival direction estimation device 5 estimates the antenna angle at which the matching degree is maximum as the arrival direction of the radio wave to the communication device 1 (S108). That is, the radio wave arrival direction estimation device 5 estimates the arrival direction of the radio wave by combining the antenna pattern with the actually measured antenna angle.

Figure 5:
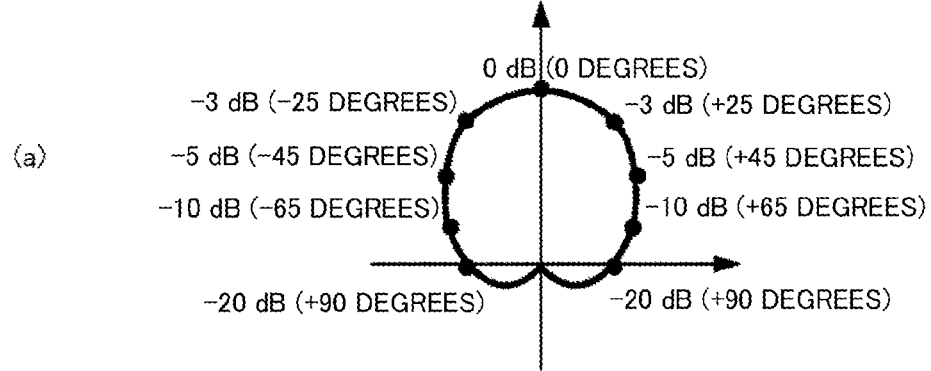
FIG. 5(a) is a diagram illustrating data of antenna patterns stored in an antenna pattern storage unit.
FIG. 5(b) shows diagrams illustrating the correspondence between antenna angles acquired by an antenna angle acquisition unit when the antenna has rotated and the reception intensity measured by a reception intensity measurement unit.
FIG. 5(c) is a diagram illustrating processing performed when a matching degree Calculation unit calculates a matching degree.
FIG. 5(d) is a diagram illustrating the result obtained after the estimation unit has estimated the radio wave arrival direction.
Figure 5:
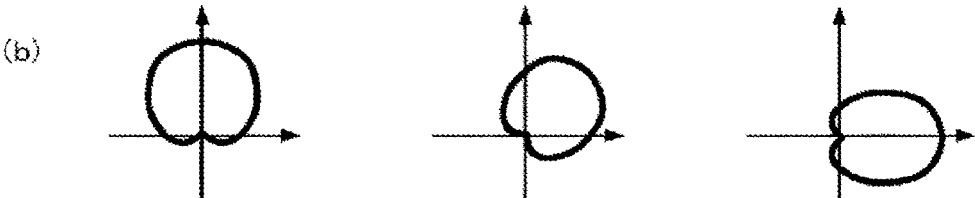
Figure 5:
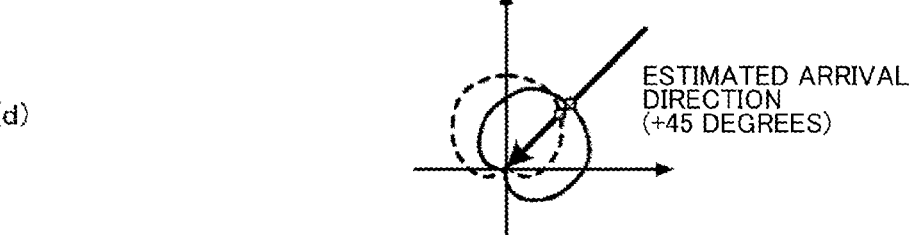

Next, a specific operation example in a case where the radio wave arrival direction estimation device 5 estimates the arrival direction of the radio wave will be described. FIG. 5 is a diagram showing a specific operation example when the radio wave arrival direction estimation device 5 estimates the arrival method of the radio wave. Here, it is assumed that only one wave has arrived.

FIG. 5(*a*) is a diagram illustrating data of antenna patterns stored in the antenna pattern storage unit 54 (FIG. 1). FIG. 5(*b*) shows diagrams illustrating the correspondence between antenna angles acquired by the antenna angle acquisition unit 50 when the antenna has rotated and the reception intensity measured by the reception intensity measurement unit 51. FIG. 5(*c*) is a diagram illustrating processing performed when the matching degree Calculation unit 55 calculates a matching degree. FIG. 5(*d*) is a diagram illustrating the result obtained after the estimation unit 56 has estimated the radio wave arrival direction.

As illustrated in FIG. 5(*a*), the antenna pattern storage unit 54 stores data indicating the antenna pattern indicated by a combination of a plurality of angles (directions) and gains in the range of −179 degrees to +180 degrees, for example.

The matching degree Calculation unit 55 extracts, for example, a combination of measurement angles (for example, three points of a difference between an angle D and an angle E, and the difference between the angle E and an angle F with the angle E as a center) from the data stored in the antenna pattern storage unit 54.

As an example, the matching degree Calculation unit 55 acquires a plurality of sets (example 1, example 2, etc.) from the antenna pattern storage unit 54 by using, for example, the following three points as a set.

First Example

−45 degrees, −5 dB
0 degrees, 0 dB,
+45 degrees, −5 dB

Second Example 0 degrees, 0 dB,
+45 degrees, −5 dB
+90 degrees, −20 dB

Furthermore, the matching degree Calculation unit 55 acquires the measured data as shown in FIG. 5(*b*) from the acquired information storage unit 53. In addition, the matching degree Calculation unit 55 calculates the relative power and the inversion angle (whose plus and minus are replaced) with respect to the maximum value as shown in FIG. 5(*c*) for the measured data of each antenna angle as described below.

Angle D→0 degrees, −5 dB
Angle E→−45 degrees, 0 dB
Angle F→−90 degrees, −6 dB

Next, a matching degree Calculation unit 55 calculates (antenna pattern dB)−(measurement result dB) in an ascending order of the antenna angles, and defines data having a large difference between the plus value and the minus value as an exclusion object as data regarding the data having been unable to be measured. At this time, the matching degree Calculation unit 55 enlarges (or reduces) the reception intensity for each antenna angle from the origin so as to compensate for the influence of attenuation of the reception power caused by the distance from the transmitting station or the like, to set the data estimated to be deviated from the antenna pattern as an exclusion object.

First Example

−45 degrees→(−5 dB)−(−6 dB)=1 dB . . . (exclusion object)
0 degrees→(0 dB)−(0 dB)=0 dB
+45 degrees→(−5 dB)−(−5 dB)=0 dB

Second Example 0 degrees→(0 dB)−(−6 dB)=6 dB
+45 degrees→(−5 dB)−(0 dB)=−5 dB
+90 degrees→(−20 dB)−(−5 dB)=−15 dB . . . (exclusion object)

The matching degree Calculation unit 55 calculates and stores the difference with respect to the antenna pattern by using the result other than the data as the exclusion object.

First Example 0 degrees→(0 dB)−(0 dB)=0 dB
+45 degrees→(−5 dB)−(−5 dB)=0 dB
Total value of differences→|0 dB|+|0 dB|=0 dB

Second Example 0 degrees→(0 dB)−(−6 dB)=6 dB
+45 degrees→(−5 dB)−(0 dB)=−5 dB
Total value of differences→|6 dB|+|−5 dB|=11 dB Then, the estimation unit 56 acquires each piece of the data stored in the matching degree Calculation unit 55, and selects a combination in which the difference between the antenna angle and the reception intensity and the antenna pattern is the minimum (the matching degree is the maximum) . Here, the combination of the first example is selected.

That is, the estimation unit 56 performs matching (comparison of matching degrees) between the reception intensities of the incoming wave measured at a plurality of antenna angles with antenna patterns (angles and gains of the antenna) and thus estimates the arrival direction of each incoming wave (FIG. 5(*d*)).

Thus, the radio wave arrival direction estimation device 5 estimates the antenna angle at which the matching degree Calculated by the matching degree Calculation unit 55 is the maximum as the arrival direction of the radio wave, so the arrival direction of the radio wave can be estimated, even without using an array antenna with high directivity. That is, the radio wave arrival direction estimation device 5 can easily estimate the arrival direction at low cost even for a radio wave of a relatively low frequency such as a VHF band, without preparing an array antenna or the like having high directivity for estimating the arrival direction of the radio wave.

The radio wave arrival direction estimation device 5 may use the difference (C/N) between a state in which the transmitting station stops transmitting signals and a state in which the transmitting station has transmitted a signal, instead of a reception intensity, to extract its own signal from the received signal.

In addition, each function of the radio wave arrival direction estimation device 5 may be partially or wholly configured by hardware such as a programmable logic device (PLD) or a field programmable gate array (FPGA), or may be configured as a program executed by a processor such as a CPU.

For example, the radio wave arrival direction estimation device 5 according to the present invention can be realized using a computer and a program, and the program can be recorded on a storage medium or provided through a network.

Figure 6:
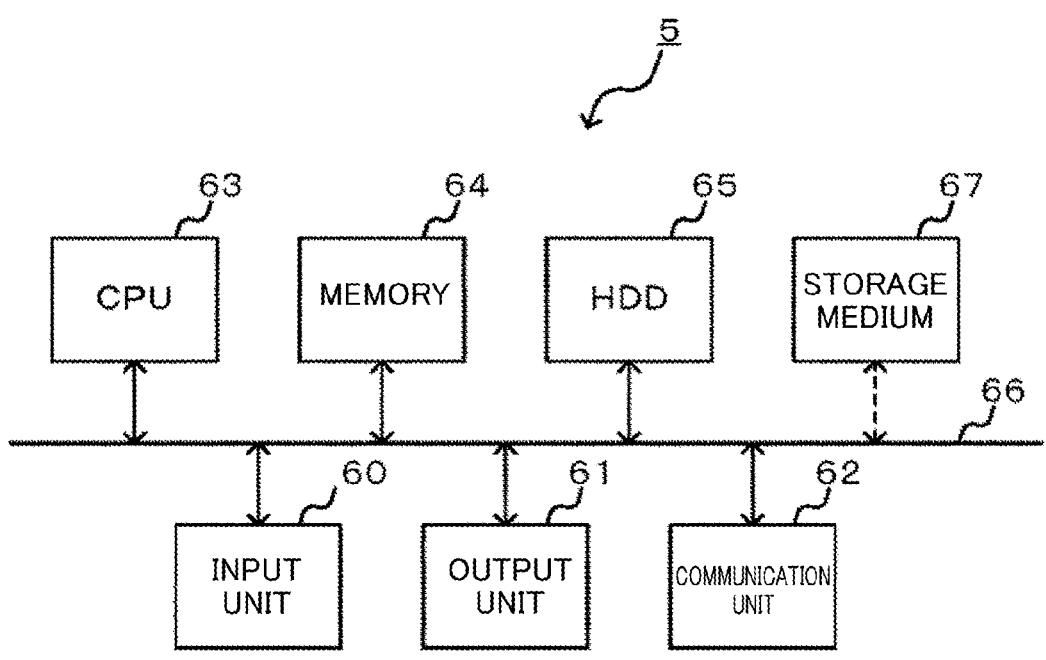
FIG. 6 is a diagram illustrating an example of a hardware configuration of the radio wave arrival direction estimation device according to an embodiment.

FIG. 6 is a diagram illustrating an example of a hardware configuration of the radio wave arrival direction estimation device 5 according to an embodiment. As illustrated in FIG. 6, for example, the radio wave arrival direction estimation device 5 includes an input unit 60, an output unit 61, a communication unit 62, a CPU 63, a memory 64, and an HDD 65 which are connected via a bus 66, and has functions as a computer. In addition, the radio wave arrival direction estimation device 5 can input and output data to and from a computer-readable storage medium 67.

The input unit 60 is, for example, a keyboard, a mouse, and the like. The output unit 61 is, for example, a display device such as a display. The communication unit 62 is a wired or wireless network interface, for example.

The CPU 63 controls the units constituting the radio wave arrival direction estimation device 5, and performs predetermined processing and the like. The memory 64 and the HDD 65 correspond to the acquired information storage unit 53 and the antenna pattern storage unit 54 for storing data and the like. The storage medium 67 can store a program or the like for executing functions of the radio wave arrival direction estimation device 5. The architecture constituting the radio wave arrival direction estimation device 5 is not limited to the example illustrated in FIG. 6.

REFERENCE SIGNS LIST

1 Communication device
2 Antenna
3 Rotation drive unit
4 Control unit
5 Radio wave arrival direction estimation device
50 Antenna angle acquisition unit
51 Reception intensity measurement unit
52 Separation unit
53 Acquired information storage unit
54 Antenna pattern storage unit
55 Matching degree Calculation unit
56 Estimation unit
60 Input unit
61 Output unit 62 Communication unit
63 CPU
64 Memory
65 HDD
66 Bus
67 Storage medium

The invention claimed is:

1. A radio wave arrival direction estimation device comprising one or more processors configured to perform operations comprising:
controlling a rotation drive to rotate an antenna having a non-uniform antenna pattern to sequentially direct the antenna in a plurality of different directions, and acquiring each of antenna angles indicating the plurality of different directions in which the antenna is sequentially directed;
measuring reception intensities at which the antenna has received a radio wave at each of the acquired antenna angles during the rotation;
calculating a matching degree between the acquired antenna angle and the measured reception intensity and an antenna pattern of the antenna for each acquired antenna angle, wherein the calculating comprises:
obtaining a difference between the reception intensity measured at each of the acquired antenna angles and a gain of the antenna pattern corresponding to the acquired antenna angle,
aggregating the differences to determine a total difference value for each acquired antenna angle, and
computing the matching degree based on the total difference value for each acquired antenna angle; and
estimating an antenna angle at which the calculated matching degree is the maximum, corresponding to where the calculated total difference value is the minimum, as an arrival direction of the radio wave.

2. The radio wave arrival direction estimation device according to claim 1, wherein the operations further comprise:
separating a component of an incoming wave or a delayed wave from the measured reception intensity, wherein, during calculating the matching degree,
a matching degree between the acquired antenna angle and the separated reception intensity of the incoming wave or delayed wave, and an antenna pattern of the antenna is calculated for each acquired antenna angle.

3. The radio wave arrival direction estimation device according to claim 2, wherein
during separating the component of the incoming wave or the delayed wave from the measured reception intensity,
each incoming wave or delayed wave with the same propagation time from a transmitting station is separated based on a correlation with an existing pattern transmitted by a transmitting station.

4. A radio wave arrival direction estimation method comprising:
controlling a rotation drive to rotate an antenna having a non-uniform antenna pattern to sequentially direct the antenna in a plurality of different directions, and acquiring each of antenna angles indicating the plurality of different directions in which the antenna is sequentially directed;
measuring reception intensities at which the antenna has received a radio wave at each of the acquired antenna angles during the rotation;

calculating a matching degree between the acquired antenna angle and the measured reception intensity and an antenna pattern of the antenna for each acquired antenna angle, wherein the calculating comprises:

obtaining a difference between the reception intensity measured at each of the acquired antenna angles and a gain of the antenna pattern corresponding to the acquired antenna angle, aggregating the differences to determine a total difference value for each acquired antenna angle, and computing the matching degree based on the total difference value for each acquired antenna angle; and estimating an antenna angle at which the calculated matching degree is the maximum, corresponding to where the calculated total difference value is the minimum, as an arrival direction of the radio wave.

5. The radio wave arrival direction estimation method according to claim 4, further comprising:

separating a component of an incoming wave or a delayed wave from the measured reception intensity, wherein, during calculating the matching degree, a matching degree between the acquired antenna angle and the separated reception intensity of the incoming wave or delayed wave, and an antenna pattern of the antenna is calculated for each acquired antenna angle.

6. The radio wave arrival direction estimation method according to claim 5, wherein, during separating the component of the incoming wave or the delayed wave from the measured reception intensity, each incoming wave or delayed wave with the same propagation time from a transmitting station is separated based on a correlation with an existing pattern transmitted by a transmitting station.

7. A non-transitory computer-readable storage medium storing a radio wave arrival direction estimation program for enabling a computer to perform operations comprising:

controlling a rotation drive to rotate an antenna having a non-uniform antenna pattern to sequentially direct the antenna in a plurality of different directions, and acquiring each of antenna angles indicating the plurality of different directions in which the antenna is sequentially directed;

measuring reception intensities at which the antenna has received a radio wave at each of the acquired antenna angles during the rotation;

calculating a matching degree between the acquired antenna angle and the measured reception intensity and an antenna pattern of the antenna for each acquired antenna angle, wherein the calculating comprises:

obtaining a difference between the reception intensity measured at each of the acquired antenna angles and a gain of the antenna pattern corresponding to the acquired antenna angle, aggregating the differences to determine a total difference value for each acquired antenna angle, and computing the matching degree based on the total difference value for each acquired antenna angle; and estimating an antenna angle at which the calculated matching degree is the maximum, corresponding to where the calculated total difference value is the minimum, as an arrival direction of the radio wave.

8. The non-transitory computer-readable storage medium according to claim 7, wherein the operations further comprise:

separating a component of an incoming wave or a delayed wave from the measured reception intensity, wherein, during calculating the matching degree, a matching degree between the acquired antenna angle and the separated reception intensity of the incoming wave or delayed wave, and an antenna pattern of the antenna is calculated for each acquired antenna angle.

9. The non-transitory computer-readable storage medium according to claim 8, wherein, during separating the component of the incoming wave or the delayed wave from the measured reception intensity, each incoming wave or delayed wave with the same propagation time from a transmitting station is separated based on a correlation with an existing pattern transmitted by a transmitting station.

* * * * *